United States Patent [19]

Barclay et al.

[11] Patent Number: 4,492,497
[45] Date of Patent: Jan. 8, 1985

[54] APPARATUS AND METHOD FOR TRANSFERRING SOLIDS

[75] Inventors: John L. Barclay, Tadworth; Alan G. Brooks, Bagshot; Clive P. J. Duebel, Meopham Green, Nr. Gravesend, all of England

[73] Assignee: The British Petroleum Company p.l.c., London, England

[21] Appl. No.: 355,148

[22] Filed: Mar. 5, 1982

[30] Foreign Application Priority Data

Mar. 26, 1981 [GB] United Kingdom ............... 8109528

[51] Int. Cl.$^3$ ............................................. B65G 53/14
[52] U.S. Cl. ................................ 406/153; 406/154; 406/108; 239/424.5; 414/293; 415/DIG. 1
[58] Field of Search ............. 406/153, 108, 154, 198; 222/637; 414/160, 293; 417/300; 415/DIG. 1; 239/424, 424.5, 425, DIG. 7

[56] References Cited

U.S. PATENT DOCUMENTS

| 3,123,285 | 3/1964 | Lee | 415/DIG. 1 |
| 3,795,367 | 3/1974 | Mocarski | 415/DIG. 1 |
| 4,037,991 | 7/1977 | Taylor | 417/80 |

FOREIGN PATENT DOCUMENTS

| 8957 | 3/1980 | European Pat. Off. | |
| 66128 | 6/1977 | Japan | 415/DIG. 1 |

Primary Examiner—Jeffrey V. Nase
Assistant Examiner—L. E. Williams
Attorney, Agent, or Firm—Morgan, Finnegan, Pine, Foley & Lee

[57] ABSTRACT

Apparatus for transferring solid particles to a receptacle comprises a primary loading tube (2) containing at its lower end an annular gas supply chamber (3) coaxially aligned within it. The innermost surface of the annular chamber (3) forms a secondary loading tube (6) which has a Coanda surface (12) at its lower end. A slot (11) is provided between the innermost surface of the gas supply chamber (3) and the Coanda surface (12) to form a Coanda nozzle.

The apparatus is particularly suitable for use in loading catalyst to a reactor and achieving a high packing density with a low voidage.

In use, particles falling near the center of the primary loading tube are entrained and separated by gas emerging from the Coanda nozzle and have a high velocity imparted to them.

2 Claims, 1 Drawing Figure

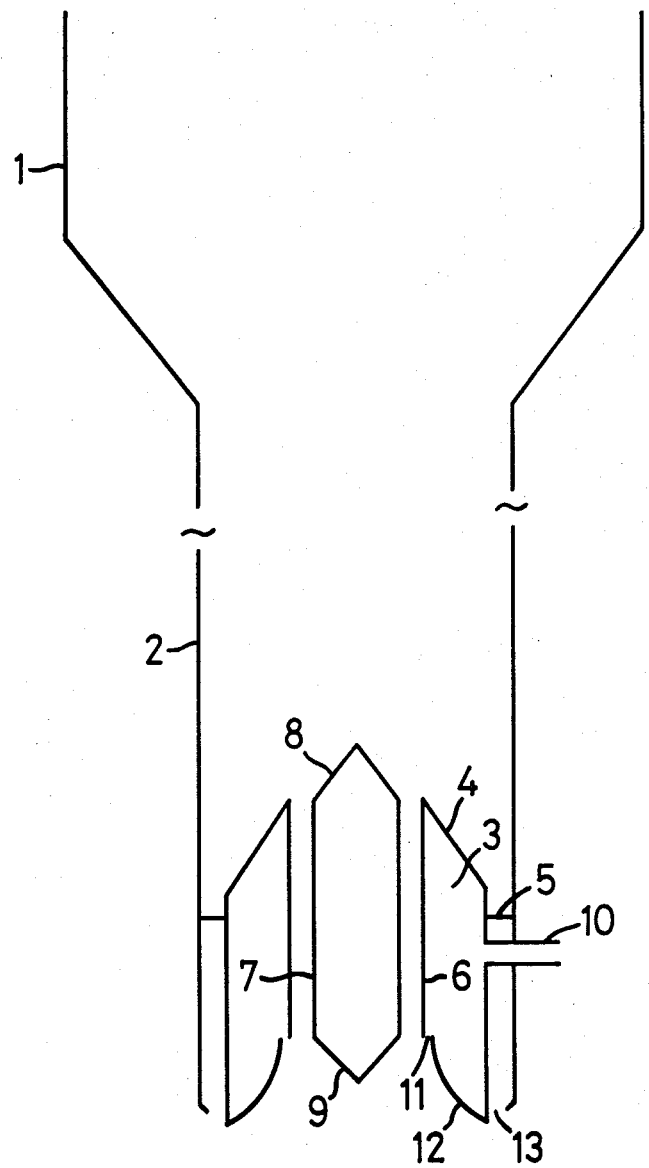

APPARATUS AND METHOD FOR TRANSFERRING SOLIDS

This invention relates to an apparatus for transferring and packing or distributing solid particles and, in particular, to an apparatus for loading catalyst to a reactor.

In the petroleum refining and chemical industries catalytic processes are employed which require reactors to be loaded with catalyst. The catalyst must be removed and replaced periodically.

In a typical loading procedure, the catalyst is first lifted to the top of the reactor in drums or larger containers. It is then poured into a hopper and down a "sock" into the reactor. The "sock" is a long flexible tube, one end of which is maintained just above the level of the catalyst bed, which is raised as the catalyst level within the reactor rises during the loading operation. From time to time the catalyst bed has to be raked over to ensure level filling.

It is necessary for a man to enter the reactor to perform this work. This gives rise to problems in designing reactors to permit entry. Furthermore, the work is unpleasant and tends to damage the catalyst. It is difficult to ensure even loading to prevent voidage and therefore it is found that this method of loading leads to low values of catalyst charging density. This may cause poor unit performance, either because there is a lower weight of catalyst in the reactor or because the bed slumps during use, leaving a void at the top.

It is known that when the extension of one lip of the mouth of a slot through which a fluid emerges under pressure progressively diverges from the axis of the exit of the slot, the stream of fluid emerging from the slot tends to stick to the extended lip. This effect creates a pressure drop in the surrounding fluid, which causes fluid flow towards the low pressure region. This physical phenomenon is known as the Coanda effect and a body exhibiting this effect is known as a Coanda body.

A Coanda nozzle may be defined as a nozzle capable of discharging a fluid at high pressure into another fluid of low pressure through a narrow slot of chosen dimensions having a surface of a Coanda body substantially contiguous with one wall of the slot.

Our European Patent Application No. 8957 discloses apparatus for transferring solid particles to a receptacle, which apparatus comprises a loading tube surrounded at or near its base by a gas supply chamber terminating in a Coanda surface, a slot between the outlet of the loading tube and the beginning of the Coanda surface forming a Coanda nozzle.

According to the present invention, there is provided apparatus for transferring solid particles to a receptacle, which apparatus comprises a primary loading tube containing at its lower end annular gas supply chamber coaxially aligned within it, the innermost surface of the annular chamber forming a secondary loading tube and at its lower end forming a Coanda surface, a slot being provided between the innermost surface of the annular chamber and the Coanda surface to form a Coanda nozzle.

Preferably an annular space is provided between the inner surface of the primary loading tube and the outer surface of the gas supply chamber.

In use, particles falling near the centre of the primary loading tube are entrained and separated by gas emerging from the Coanda nozzle and have a high velocity imparted to them.

The upper external surface of the gas supply chamber guides particles which do not fall directly into the secondary loading tube towards the side wall of the primary loading tube and into the annular space between it and the gas supply chamber. On reaching the base of the gas supply chamber they also are entrained with the stream of gas emerging from the Coanda nozzle.

The particles emerge in the form of a cone, the apex of which is termed the spray angle.

Preferably the secondary loading tube contains at its lower end a cylinder coaxially aligned within it to provide an annulus for the passage of solid particles. This cylinder will subsequently be termed a throttle.

The throttle serves to direct particle flow close to the Coanda nozzle and to control the rate of supply of the particles.

In use, the loading tube is normally filled with particles and this combats the tendency of the atmosphere to pass down the loading tube into the region of the Coanda nozzle.

The apparatus is particularly useful for loading catalyst to a reactor and achieving a high packing density with low voidage. The catalyst may be in the form of granules, cylinders or spheres, preferably up to 3 mm in diameter. It is not, however, limited to such applications and may be used for loading, packing and distributing other particulate materials, such as fertilisers.

The apparatus achieves higher loading rates with more efficient utilisation of gas than prior art devices. The spray angle is wide and is particularly beneficial in the loading of large diameter vessels or distributing the particles over a wide area.

The apparatus is preferably constructed from aluminium, steel or stainless steel, but other rigid materials may be used if desired.

In most circumstances air will be a suitable motive gas, but under hazardous conditions an inert gas such as nitrogen can be employed.

The spread of particles achieved by the entrainment is a function of many variables including the geometry of the system, e.g. the diameters of the primary and secondary loading tubes, the width of the Coanda nozzle, the shape, e.g. radius, of the Coanda surface, the rate of particle supply and the pressure of the gas supply. These variables can readily be adjusted to give the desired uniform distribution.

Suitably the width of the Coanda nozzle is in the range 0.1 to 3.0 mm, preferably 0.2 to 2.0 mm.

The gas pressure is an easy variable to adjust and by adjusting it the distribution of the particles below the discharge end of the loading device can be varied.

However, the gas pressure can be maintained constant if desired and in many cases this will be the simplest method of operation.

Suitable gas pressures lie in the range 0.35 to 7 bars, preferably 0.7 to 3.5 bars.

A particular advantage of the apparatus according to the present invention is that it can be used to pack a reactor uniformly without necessarily lowering or raising the loading tube during the packing. Thus initially during the loading procedure the gas flow can be adjusted so that the particle distribution is satisfactory by the time the particles reach the bottom end of the reactor. As the level of packed particles rises within the reactor, the gas flow can be adjusted to ensure satisfactory distribution is maintained.

The invention is illustrated with reference to the accompanying drawing.

Catalyst is contained in a storage hopper 1, the exit from which leads to a primary loading tube 2. At its lower end the tube 2 surrounds an annular gas supply chamber 3 fitted with a sloping shoulder 4 and maintained in position by struts 5. The central aperture of the chamber 3 provides a secondary loading tube 6. A cylindrical throttle 7 having conical ends 8 and 9 is supported within the tube 6 by means not shown. The chamber 3 is supplied with air from a line 10. Its exit is formed by a slot 11 between the wall of the loading tube 6 and a Coanda surface 12. A further slot 13 is formed between the walls of the tube 2 and the supply chamber 3.

Suitable dimensions are:

|  |  |
|---|---|
| Diameter of tube 2 | 300 mm |
| External diameter of chamber 3 | 160 mm |
| Internal diameter of chamber 3 | 98 mm |
| Diameter of throttle 7 | 67 mm |
| Radius of Coanda surface 12 | 15 mm |
| Width of slot 11 | 0.25 mm |
| Width of slot 13 | 25 mm |

In use, a stream of air enters the chamber 3 through the line 10. The air is then forced out of the Coanda slot 11 and follows the Coanda surface 12 adjacent to the slot 11, producing a cone of air.

Catalyst particles contained in the hopper 1 flow down the primary loading tube 2. Some flow directly into the secondary loading tube 6 or are diverted into it by the conical top 8 of the throttle 7. Some flow directly into the annulus formed by the tube 2 and the chamber 3 or are diverted into it by the sloping shoulder 4 of the chamber 3.

Particles flowing down the secondary loading tube 6 are entrained by the airflow through the slot 11. Particles flowing through the annulus formed by the tube 2 and the chamber 3 are entrained by the mass of air and catalyst particles leaving the Coanda surface 12. The particles are thereafter evenly distributed over the base of a reactor (not shown).

We claim:

1. Apparatus for transferring solid particles to a receptacle from a storage hopper (1), which apparatus comprises a primary loading tube, a Coanda surface and a Coanda nozzle characterised by the fact that the primary loading tube (2) contains at its lower end an annular gas supply chamber (3) spaced inwardly of the tube (2) and coaxially aligned within it to provide an annular space between the inner wall of the primary loading tube (2) and the outer wall of the annular gas supply chamber (3), the innermost surface of the annular chamber (3) forming a secondary loading tube (6) and at its lower end forming a Coanda surface (12), a slot (11) being provided between the innermost surface of the gas supply chamber (3) and the Coanda surface (12) to form a Coanda nozzle said primary loading tube and said secondary loading tube being open at each end and the secondary loading tube (6) contains at its lower end a cylinder (7) coaxially aligned within it to provide an annulus for the passage of solid particles the aforementioned apparatus providing satisfactory distribution of solid particles at high loading rate with efficient utilization of gas.

2. Apparatus claim 1 characterised by the fact that the width of the slot (11) is in the range 0.1 to 3 mm.

* * * * *